United States Patent [19]
Swenson

[11] Patent Number: 5,625,752
[45] Date of Patent: Apr. 29, 1997

[54] ARTIFICIAL NEURAL SYSTEM WITH BINARY WEIGHTING BY EQUAL RESISTOR NETWORK

[75] Inventor: Richard M. Swenson, Ridgecrest, Calif.

[73] Assignee: The United States of America as represented by the Secretary of the Navy, Washington, D.C.

[21] Appl. No.: 266,813

[22] Filed: Jun. 17, 1994

[51] Int. Cl.$^6$ .............................. G06E 1/00; G06E 3/00; G06F 15/18
[52] U.S. Cl. ................................ 395/24; 395/21; 395/23
[58] Field of Search ................................ 395/21, 23, 24, 395/27, 22, 25; 364/276.6; 382/155–159

[56] References Cited

U.S. PATENT DOCUMENTS

| | | | |
|---|---|---|---|
| 4,951,239 | 8/1990 | Andes | 364/807 |
| 5,150,450 | 9/1992 | Swensen et al. | 395/23 |
| 5,350,953 | 9/1994 | Swenson | 307/464 |
| 5,396,581 | 3/1995 | Mashiko | 395/24 |
| 5,434,951 | 7/1995 | Kuwata | 395/24 |
| 5,440,670 | 8/1995 | Frazier | 395/22 |
| 5,479,578 | 12/1995 | Engeler | 395/27 |

OTHER PUBLICATIONS

Fisher, William A., Robert J. Fujimoto, and Robert C. Smithson. "A Programmable Analog Neural Network Processor". IEEE Transactions on Neural Networks, vol. 2, No. 2 Mar. 1991.

Publication:Mark Hollar, Simon Tam, Hernan Castro, and Ronald Benson; "An Electrically Trainable Artificial Neural Network (ETANN) with 10240 'Floating Gate' Synapses"; *International Joint Conference on Neural Networks;* Washington, D.C.; Jun. 18–20; vol. II, pp. 191–196.

Paper: Chi Yung Fu, Benjamin Law, George Chapline, and Dick Swenson; "Customizable VLSI Artificial Neural Network Chips Based in a Novel Technology"; 1992.

*Primary Examiner*—Tariq R. Hafiz
*Attorney, Agent, or Firm*—Melvin J. Sliwka; Stephen J. Church

[57] ABSTRACT

An artificial neural system has input operational amplifiers providing differential voltage input signals to a neuron including a voltage divider network having a plurality of substantially equal resistances selectably connectable to the components of the input signals so as to define the bits of binary weights for each of the input signals and to generate unweighted network output voltage signals corresponding to each bit position of the weights and representing the sums of the products of each input signal and the bit at each bit position. The unweighted bit position signals are provided to a bit position weighting device which is common to all of the weights of a neuron and which weights the unweighted signals by the binary positional values of the bit positions. The unweighted bit position signals are differential signals having one component generated by reference resistances of the network, and the sign of each weight may be selected by connection of the reference resistances to one or the other of the input signal components. A preferred embodiment has only one reference resistance for each weight. This reference resistance corresponds to a sign bit position, and the reference resistances for all of the weights are connected to provide a common reference voltage component for all of the unweighted bit position signals. Differential voltage output signals from a system utilized as one artificial neural layer may be directly connected as differential voltage input signals for the voltage divider network of a system utilized as a second layer.

11 Claims, 8 Drawing Sheets

ARTIFICIAL NEURAL SYSTEM WITH BINARY WEIGHTING BY EQUAL RESISTOR NETWORK

BACKGROUND OF THE INVENTION

1. Field of the Invention

This invention pertains to the field of pattern recognizers or artificial neural networks capable of supervised or unsupervised learning. More particularly, it pertains to such networks having neurons with digital weighting by a resistor network.

2. Description of the Prior Art

The general theory and operation of artificial neural networks (ANN) together with their existing and potential uses, construction, and methods and arrangements for learning and teaching have been extensively described in publicly available literature and need not be repeated herein. However, U.S. Pat. No. 4,951,239, which issued 21 Aug. 1990, and U.S. Pat. No. 5,150,450, which issued 22 Sep. 1992, describe aspects of artificial neural networks useful as a background of the present invention. Accordingly these patents, of which the present inventor is a coinventor, are incorporated herein by reference.

For the purposes of the present invention it is only necessary to realize that an ANN has a plurality of "neurons" each having a plurality of "synapses" individually receiving input signals to the network. Each synapse weights its received input signal by a factor, which may be fabricated into the network, may be loaded later as part of a predetermined set, or may be "learned". The synapses generate weighted signals which are summed by a common portion of the neuron, often termed the "neuron body", to generate a sum signal which, typically, is output by the neuron body after modification by a sigmoid or other "activation function" which is not directly involved in the present invention.

A practically usable ANN may have on the order of a hundred neurons each with on the order of a hundred or more synapses. It is, therefore, apparent that even with a very large scale integrated (VLSI) circuit it is important that the elements of each body and, especially, each synapse be of simple, compact, and regular configuration.

Prior art artificial neural network neurons have been implemented with a variety of weighting arrangements which, while generally effective, have various deficiencies such as lack of resolution, particularly over time and with repeated changes. This deficiency is avoidable by the use of synapses with digital weighting. However, since resolution to one part in 256—the integer two to the eighth power—or more is typically necessary for practical use of an ANN, it is apparent that providing such weighting at each synapse, as by field effect transistors (FET) having different widths corresponding to powers of two or some other number, requires elements of different sizes with the more significant digits having elements on the order of several hundred times larger than corresponding elements for the least significant digit. The use of such large elements and of such varying sizes in the synapses would result in impractically large circuits.

Also with VLSI circuits, temperature and fabrication variations across a chip cause different characteristics at different portions of the chip and may result in different synapses of even the same neuron having weight differences exceeding the necessary resolution. Such temperature and fabrication variations are particularly significant with transistors which have relatively complex structure requiring several integrated circuit layers participating in transistor functioning. As a result the characteristics of transistors tend to vary significantly with fabrication and temperature differences in the same integrated circuit. Transistors, in any event, have linear conductance characteristics only over relatively limited ranges which may impose undesirable limits on the dynamic range and useful voltage ranges of ANN employing transistors for weighting.

Further and since the synapse weights of an ANN may, for different applications, be unmodifiable after initial fabrication in a VLSI or other circuit; be generated after fabrication but not be readily changed after generation; or be readily changed, as by switching, when in use and as required in learning, it is essential that circuits providing such weights be adapted to not only provide the necessary resolution, temperature and fabrication variation immunity, and configuration for VLSI or other implementation; but be adapted to constructions providing the requisite fixed or modifiable weights.

ANN circuits overcoming certain of the above-described prior art problems and in meeting certain of the above-described requirements are disclosed in U.S. Pat. application Ser. No. 08/069,943, filed 28 May 1993 and which issued 27 Sep. 1994 as U.S. Pat. No. 5,350,953, and titled "DIGITALLY WEIGHTED NEURON FOR ARTIFICIAL NEURAL NETWORK". This prior filed application is commonly owned with the present application, has the present inventor as a coinventor, and is incorporated herein by reference. This prior filed application, Ser. No. 08/069,943, is characterized by an artificial neural network neuron wherein digital weighting of input signals is effected at a common portion of the neuron rather than at each synapse thereof and by the use of differential signals. This neuron of application Ser. No. 08/069,943 provides binary sign and bit selection by switching of input and reference signals at each synapse. In application Ser. No. 08/069,943 however, the weights of each synapse are provided by transistors which, although effective, have the before stated undesirable characteristics.

An integrated circuit resistor structure and method for forming this structure, which is also effective in overcoming certain of the above-described prior art problems and in meeting certain of the above-described requirements; which allows selectable switching; and which avoids the limited linearity and temperature and location related variations of transistors, are claimed in U.S. patent application Ser. No. 07/894,391, filed 5 Jun. 1992, titled "PROCESS FOR FORMING SYNAPSES IN NEURAL NETWORKS AND RESISTOR THEREFOR", and having Chi-Yung Fu as inventor. This prior filed application, Ser. No. 07/894,391, is also commonly owned with the present application and is also incorporated herein by reference.

SUMMARY AND OBJECTS OF THE INVENTION

An artificial neural system has input operational amplifiers providing differential voltage input signals to a neuron including a voltage divider network having a plurality of substantially equal resistances selectably connectable to the components of the input signals so as to define the bits of binary weights for each of the input signals and to generate unweighted network output voltage signals corresponding to each bit position of the weights and representing the sums of the products of each input signal and the bit at each bit position. The unweighted bit position signals are provided to a bit position weighting device which is common to all of the weights of a neuron and which weights the unweighted signals by the binary positional values of the bit positions. The unweighted bit position signals are differential signals having one component generated by reference resistances of the network, and the sign of each weight may be selected by connection of the reference resistances to one or the other of the input signal components. In a preferred embodiment, there is only one reference resistance for each weight. This reference resistance corresponds to a sign bit position, and the reference resistances for all of the weights are connected to provide a common reference voltage component for all of the unweighted bit position signals. The system may be arranged as a first artificial neural layer providing differential voltage input signals directly to a voltage divider network of a similar system serving as a second such layer and lacking the input operational amplifiers.

It is an object of the present invention to provide an artificial neural network system providing precise weighting and summing of input signals.

Another object is to provide such a system adapted to and effective with very large scale integrated (VLSI) circuits, particularly such circuits constructed by complimentary metal oxide semiconductor (CMOS) techniques.

Still another object is to provide such a system which retains its precision in an integrated circuit having temperature and fabrication variations.

Yet another object is to provide such a system adapted for elements which are simple, compact, and regular when the system is implemented by an integrated circuit.

A further object is to provide such a system having synapses providing digital weighting wherein the elements associated with each of the digits are of substantially the same size.

A particular object is to provide such a system wherein each such element associated with the digits is advantageously implemented by a resistor which has substantially the same structure and resistance for each digit and which can be selectably connected to determine the sign and magnitude of a synapse weight incorporating the element.

Another particular object is to provide such a system adapted to serve as first artificial neural layer providing differential voltage input signals directly to a second such system serving as a second layer.

Additional objects are to provide an artificial neural network system which provides the above and other advantages and which is economical to construct, dependable in operation, and fully effective.

BRIEF DESCRIPTIONS OF THE DRAWINGS

Other objects, advantages, and novel features of the present invention will be apparent from the following detailed description when considered with the accompanying drawings wherein.

DETAILED DESCRIPTION

Single Layer System Embodying the Present Invention

Figure 1:
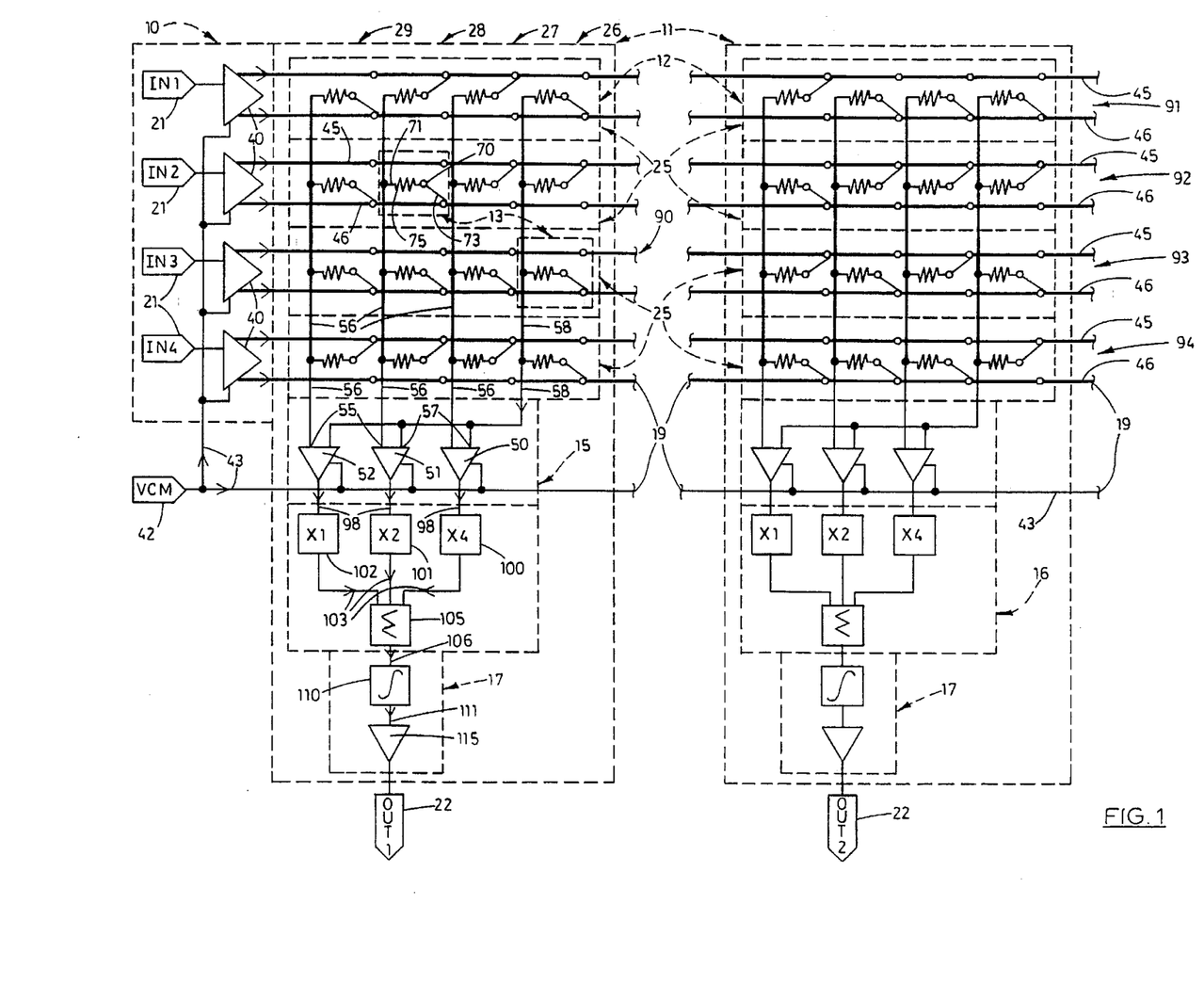
FIG. 1 is a simplified diagram of an artificial neural system embodying the principles of the present invention by binary weighting using resistance divider networks wherein all resistances are equal and wherein sign and magnitude bit selection are effected in synapses of the system by switching differential input signals.

FIG. 1 is shows an artificial neural system having an input section 10 and a pair of substantially identical neurons 11. Each neuron has, as piece de resistance, a resistance divider network 12 including a plurality of resistor elements each corresponding to the structure represented at dash line boxes 13, all of the resistor elements having substantially equal resistances. Each neuron also has a neuron body including a summing section 15, a weighting section 16, and an output section 17. Wavy lines 19 indicate where additional neurons may be connected. In the neurons, network 12 and sections 15 and 16 embody the principles of the present invention by providing, in a manner subsequently described in detail, binary weighting for four system input signals, identified by "IN1" through "IN4" and numeral 21, to generate a pair of system output signals individually corresponding to the neurons and identified by "OUT1" and "OUT2" and numeral 22. Each output signal 22 corresponds to the sums of the products of the input signals 21 and mathematically signed binary weights. These weights correspond individually to the input signals and are predeterminable by a connection, subsequently described in detail, of each resistor element within its network 12. The artificial neural system of FIG. 1 may serve as one layer of a multilayer ANN as described in the above-mentioned U.S. Pat. No. 4,951,239.

For simplicity in exposition, the FIG. 1 system has only the four input signals 21 and the two neurons 11 instead of the before mentioned much larger number typical of a practically useful artificial network. Also for simplicity, each neuron 11 has binary weighting by only one sign bit and three magnitude bits instead of the one sign bit and seven magnitude bits typically required. The connections between signals 21 and 22 are effected at each neuron through four synapses 25 thereof which correspond individually to the input signals 21. Each synapse has four of the resistor elements such as those indicated by numeral 13, and these four resistor elements correspond individually to the sign and magnitude bits. Each neuron and each synapse thus has elements individually associated with each of these bits and identified by arrows and numerals wherein numeral 26 corresponds to the position of the sign bit, numeral 27 corresponds to the position of the most significant magnitude bit, numeral 28 corresponds to the position of an intermediate significant magnitude bit, and numeral 29 corresponds to the position of the least significant magnitude bit. As will be subsequently apparent, the resistor element associated in each synapse with the sign position serves as a reference resistor for a binary weight defined by the synapse while the others of the resistor elements are a plurality thereof serving to define magnitude bits of this weight.

Figures 2A, 2B, 3:
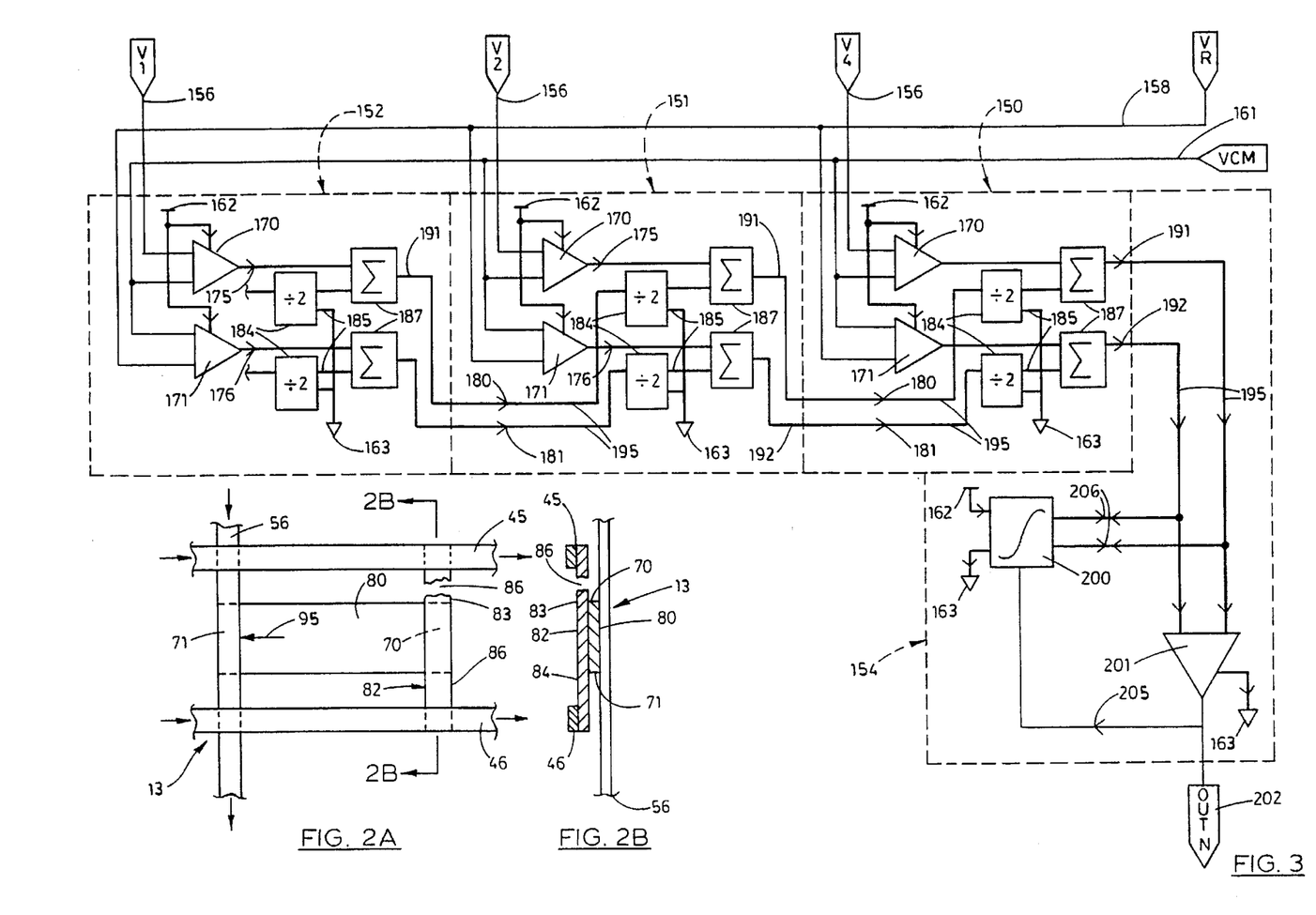
FIG. 2A is a diagram of a resistor unit forming one of the equal resistances and having severable links providing said switching, one of the links being depicted in a severed condition.
FIG. 2B is a section of the resistor unit of FIG. 2A from the position of line 2B thereof.
FIG. 3 is a somewhat more detailed diagram of summing and weighting circuits for use with one of the resistance divider networks of FIG. 1 and embodying the principles of the present invention by the use of bit position weighting circuits wherein current signals at one bit position are divided by two before summing at more significant bit positions.

FIG. 1 shows the basic principles of the present invention, and FIGS. 2A and 2B and FIG. 3 show other aspects thereof in somewhat less simplified form. The balance of the figures, FIG. 4, FIGS. 5A and 5B, and FIGS. 6A and 6B, show detailed circuits presented, not as limiting the present invention, but as enabling one skilled in the CMOS and VLSI art to implement what is presently believed to be the most advantageous embodiment of the present invention.

In the FIG. 1 system, input section 10 has four network input operational amplifiers 40, each receiving one of the input signals 21 and any suitable common mode voltage provided to the system as indicated by "VCM" and numeral 42 and distributed to the amplifiers 40 and neurons 11 by conductors 43. Each amplifier 40 functions in a well-known manner to provide a differential voltage signal defined between a first or positive component voltage and a second or negative component voltage. The positive and negative component voltages are equally above and below the common mode voltage and, preferably, are linearly related to the corresponding signal 21. Each amplifier 40 serves as a source or as a sink of currents for the resistance divider networks 12 so as to maintain the first and second component voltages constant, within the design parameters of the system, for any value of the input signals. The differential signals from each amplifier 40 are input to the networks 12 by a first network conductor 45 extending through the networks and carrying the first component voltage and by a second network conductor 46 extending through the networks and carrying the second component voltage, conductors 45 and 46 also carrying the currents having amplifiers 40 as sources or drains. As seen in FIGS. 1, 2A, and 2B, the conductors 45 and 46 from each amplifier 40 extend through the four of the synapses 25 corresponding to the same system input 21 as the amplifier and extend oppositely of and parallel to the resistor elements 13 of these synapses. This arrangement is depicted diagrammatically in FIG. 1, but as seen in FIGS. 2A and 2B, is also the physical disposition of elements 13, 45, and 46 in a preferred embodiment of the present invention.

Each neuron 11 has three network output operational amplifiers 50–52 which correspond, respectively, to the bit positions 27–29 and receive network output differential voltage signals each having, similarly to the input signals described in the immediately preceding paragraph, a first component and a second component. Each amplifier 50–52 also receives the common mode voltage through conductor 43. For each amplifier 50–52, the corresponding first component is transmitted thereto at a first terminal 55 thereof by a third network conductor 56 extending through the synapses 25 at the four of the resistor elements 13 corresponding to the same bit position as the amplifier. However, the second component is a reference voltage or signal, indicated in FIG. 3 by "VR" and transmitted to each amplifier 50–52 at a second terminal 57 thereof on a fourth network conductor 58 extending through the synapses at the four of the resistor elements 13 corresponding to the sign bit position 26 and branching to each amplifier 50–52. Portions of conductors 56 and 58 indicated by heavier lines may also carry the currents having input amplifiers 40 as sources or drains, similar heavier lines also being used for conductors 45 and 46 to indicate that these later conductors also carry such currents.

It can be seen from FIGS. 1, 2A, and 2B that each resistor element 13 corresponds to the one of the first conductors 45 and to the one of the second conductors 46 extending oppositely along the resistor element from one of the input amplifiers 40 providing an input differential signal to these conductors. Each resistor element 13 also corresponds to the one of the third and fourth conductors, 56 or 58—a conductor 56 in the case of elements 13 corresponding to magnitude bit positions 27–29 and a conductor 58 in the case of elements 13 corresponding to sign or reference bit positions 26. Each resistor element has a terminal 70 for selectable connection to a predetermined one of the associated conductors 45 or 46 and an electrically and physically opposite terminal 71 connected to the corresponding one of the conductors 56 or 58, this selectable connection being indicated in FIG. 1 by the conventional symbol 73 for a switch. Terminals 70 and 71 are disposed in spaced relation in a direction along conductors 45 and 46, and these conductors are disposed oppositely of terminal 70 in a direction transversely of these conductors.

It is evident from FIG. 1 that, at each neuron 11, each third conductor 56 corresponding to one of the bit positions 27–29 interconnects all of the terminals 71 of each element 13 corresponding to that bit position and the first terminal 55 of the one of the output amplifiers 50–52 corresponding to that bit position. It is also evident that the fourth conductor 58 interconnects all of the terminals 71 of each element corresponding to bit position 26 and all the second terminals 57 of all of the output amplifiers 50–52.

A structure believed highly advantageous for use as the resistor elements 13 when the present invention is implemented by CMOS integrated circuit techniques is disclosed in the above-identified U.S. patent application Ser. No. 07/894,391, titled "PROCESS FOR FORMING SYNAPSES IN NEURAL NETWORKS AND RESISTOR THEREFOR". FIGS. 2A and 2B show conductive portions of this structure in simplified form with surrounding material omitted and with numerals corresponding to those associated with the one of the elements 13 enclosed in a dash line box in FIG. 1. The FIGS. 2A and 2B element has a planar resistor 80 electrically connected at the terminal 71 end thereof to the conductor 56. This element has an electrically conductive bar 82 extending transversely of and electrically connected to conductors 45 and 46 and electrically connected to resistor 80 at the terminal 70 end thereof. Bar 82 thus defines a first link 83 between terminal 70 and conductor 45 and a second link 84 between terminal 70 and conductor 46. These links are selectively severable as set forth in the above-identified application Ser. No. 07/894,391 so that selectable connection or switching of terminal 70 to a predetermined one of the conductors 45 or 46 is effected by severing the one of the links 83 and 84 to the other of these conductors. In FIGS. 2A and 2B, for example, a connection to conductor 46 alone is selected by severing link 83 as indicated by numeral 86, this connection corresponding to that indicated in FIG. 1 at numeral 73.

It is apparent that, at each synapse 25 and in view of the resistor element 13 structure just described, such element associated with the reference or sign bit position 26 serves to connect the resistor 80 of this element to a selected one of the voltage components on conductors 45 or 46 so that the resistor provides a reference signal on conductor 58 for reception by the output amplifiers 50–52. It is also apparent that at each synapse there is only the single reference resistor, that associated with bit position 26. Since all of the resistance elements 13 of a network 12 have substantially equal resistances as before stated, it is further apparent that the resistor element associated with the reference bit position 26 of a synapse provides substantially the same resistance as each of the resistor elements 13 associated with the other bit positions 27–19 of the synapse.

It is further apparent that each resistor, which corresponds to one of the equal resistors 80, in a network, which corresponds to network 12, may be selectively switched to and from a pair of differential input signal conductors, which correspond to conductors 45 and 46, by transistors or other active devices controlled by signals corresponding to Cartesian coordinates of the network as shown in the above-identified United States patent application Ser. No. 08/069,943 titled "DIGITALLY WEIGHTED NEURON FOR ARTIFICIAL NEURAL NETWORK".

Each resistance element 13 provides selective switching thereat of its associated third conductor 56 or fourth conductor 58 to a predetermined one of the component voltages on the pair of input component conductors 45 and 46 also associated with the resistance element. Each element 13 also selectively switches, and thus disconnects, such conductor 56 and 58 from the other of the component voltages. By this switching, each resistance element defines the bit at the bit position 26–29 of the synapse 25 which includes the resistance element, and all of the resistance elements of a synapse define thereat a signed magnitude binary weight for the differential signal provided by the pair of input conductors.

In defining such a signed magnitude binary weight in accordance with the principles of the present invention, at each sign or reference bit position 26 of a synapse 25 the sign bit is effective as a "zero" or positive sign when the reference conductor 58 is connected to the negative component conductor 46, and the sign bit is effective as a "one" or negative sign when the conductor 58 is connected to the positive component conductor 45. At any one of the magnitude bit positions 27–29 of a synapse, the magnitude bit is effective as a "zero" when the corresponding conductor 56 is connected to same conductor, 45 or 46, to which the reference conductor 58 is connected at bit position 26 of the synapse, and the magnitude bit is effective as a "one" when such conductor 56 is connected to the other of the conductors 45 or 46.

Examples of such signed magnitude binary weights are indicated by synapse bit switch positions in FIG. 1 wherein numeral 90 indicates a synapse set to "0000", a positive zero; numeral 91 indicates a synapse set to "1000", a positive one; numeral 92 indicates a synapse set to "1001", a negative one; numeral 93 indicates a synapse set to "1010", a positive five; and numeral 94 indicates a synapse set to "1111", a negative seven; the balance of the FIG. 1 switch positions being arbitrary.

Why such definition of a signed magnitude binary weight is effective will be apparent from the following considerations. The above described connections of a network 12 within a neuron 11 result in the resistor element 13 of each magnitude bit position 27–29 providing, at the terminal 71 of the element, a synapse bit position signal 95 corresponding to the value of the associated input signal 21 when the resistor element is effectively "one" and is connecting the terminal 71 to a different one of the voltages on the corresponding conductor 45 or 46 than the voltage to which the resistor element at the corresponding sign bit position 26 is switched. However and when such magnitude bit resistor element is effectively "zero", terminal 71 of the magnitude bit resistor element is, in effect, connected—via its associated conductor 56, via the associated one of the differential output amplifiers 50–52, via a connection from these amplifiers through conductor 58 to the reference resistor element at the associated reference bit position 26, and via this reference resistor element—to the same conductor 45 or 46 voltage as the terminal 70 of the magnitude bit resistor element is connected. This "zero" connection of both terminals, 70 and 71, of a magnitude bit resistor element to the same one of the conductors 45 or 46 and across both input terminals 55 and 57 of the corresponding differential amplifier 50–52 results in the bit position signal 95 from the resistor element having a value with no effect at the differential amplifier. The zero condition thus has the effect of disconnecting the differential voltage signal across the conductor pair 45 and 46 and at the magnitude bit resistor element from the differential amplifier. Conversely the connections in a neuron 11 of terminals 70 and 71 of a magnitude bit resistor element in the "one" condition thereof effectively connect the differential voltage signal across the input terminals of the differential amplifier.

In each neuron 11 of FIG. 1, the summing section 15, the weighting section 16, and the output section 17 are represented diagrammatically to show functions performed in a neuron body. However, these functions may be combined as in the circuits of FIGS. 3, 4, 5A and 5B, and 6A and 6B.

In FIG. 1 and for each magnitude bit position 27–29, the amplifier 50–52 generates an unweighted bit position sum signal 98 corresponding to the difference between the reference signal provided at terminal 57 of the amplifier via the conductor 58 and what is, in effect, the sums of those synapse bit position signals 95 connected at terminal 55 of the amplifier via the corresponding conductor 56 and determined, as set forth above, by the selected magnitude resistor element 13 connections of the conductor 56 to the component voltages on conductors 45 and 46. A network 12 and its associated differential amplifiers 50–52, which receive voltages generated in the network as output differential voltage signals thereof across the terminals 55 and 57, serve to sum the bit position signals 95 in a manner that will be evident to one skilled in the electric circuit art from the superposition theorem applied to the network as defined by the connections established by the resistor elements 13 of the network for conduction of currents therein and by the connections via conductors 56 and 58 for receiving the voltages generated in the network and related to these currents.

In FIG. 1, the weighting section 16 of each neuron 12 is depicted as having an "×4" factor multiplier 100 receiving the unweighted bit position sum signal 98 corresponding to magnitude bit 27, an "×2" factor multiplier 101 receiving such signal corresponding to magnitude bit 28, and an "×1" factor multiplier 102 receiving such sum signal corresponding to magnitude bit 29. These multiplier factors indicate that the unweighted bit position sum signals are weighted proportionally to the binary positional binary value of the corresponding magnitude bit positions to generate signals 103 representing the products of these binary values and the corresponding bit position sum signals. Signals 103 are provided to a any suitable device 105 which sums these signals and thus generates an output signal 106 representing the sums of these products and the corresponding binary positional values. Since each signal 98 represents the sum of the signals 95, it is evident that signal 106 corresponds to the sum of the values of each of the input signals 21 and the corresponding binary weights represented at each synapse 25 by the weight bits defined thereat by the selected connections provided by the resistor elements 13 of the synapse.

The output section 17 of each neuron 11 has any suitable circuit 110 receiving the corresponding signal 106 and applying a desired activation function, typically the depicted sigmoid, to the signal 106 and generating a signal 111 provided to a neuron output driver 115 which, in turn, generates the neuron output signal 22. It is apparent that signals 111 and 22 are both derived from signal 106 and thus, similarly, correspond to the sum of the values of each of the input signals 21 and the associated binary weights of each synapse 25. In an actual embodiment of the present invention, functions represented by elements 50–52, 100–102,105, 110, and 115 may include any suitable gains for the associated signals so that these signals may exist as any suitable currents or voltage levels during the transformations generating the output signals 22 which may be of any type, current or voltage, single ended or differential, and may have any suitable level. If signals 22 are differential voltage signals provided by a driver corresponding to driver 115 and having sufficient fan-out, such signals may be provided directly to a network 12 without the use of input amplifiers corresponding to FIG. 1 amplifiers 40, an arrangement subsequently described in greater detail.

Figure 4:
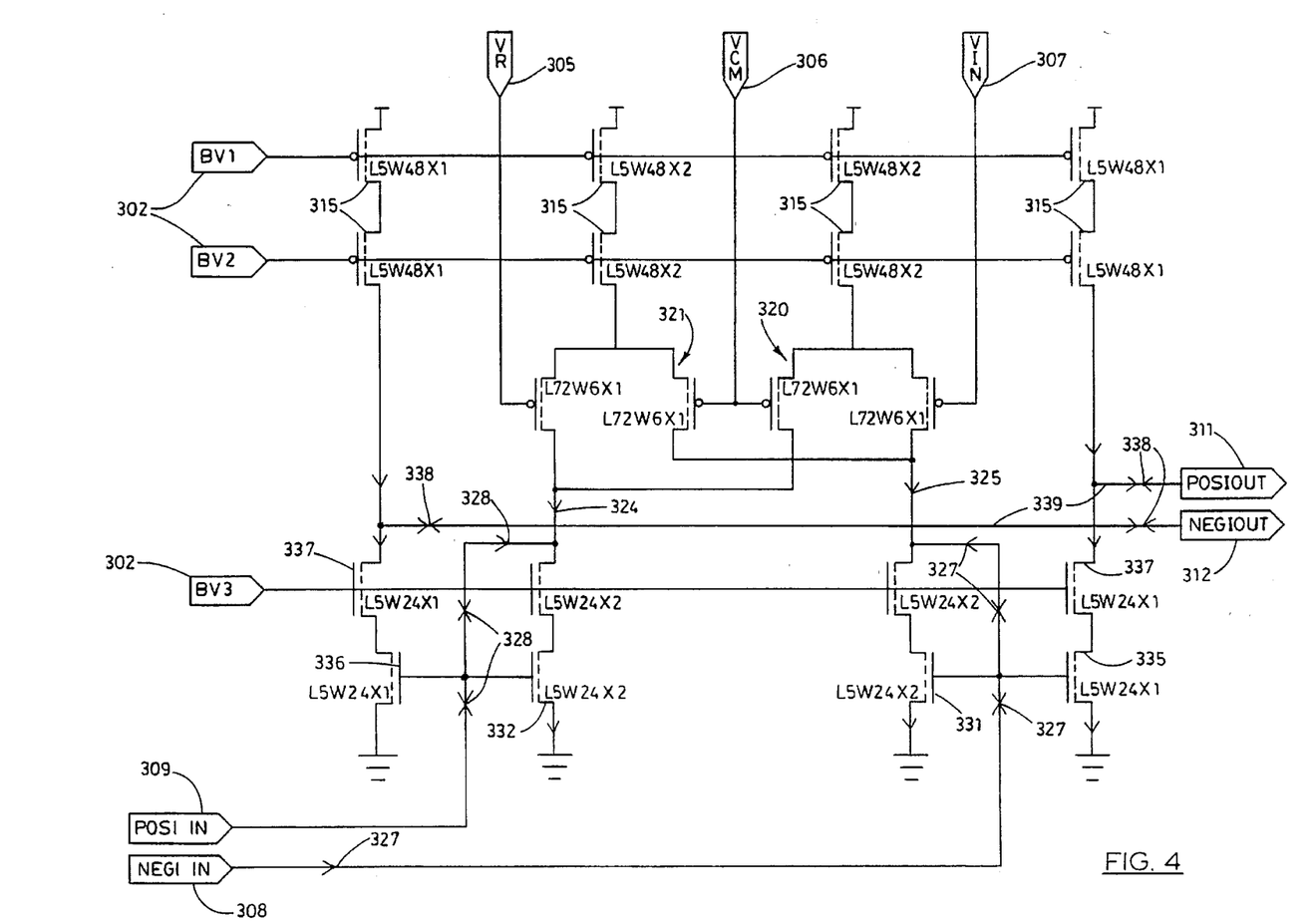
FIG. 4 is a diagram at the transistor level of a circuit corresponding to one of the bit position weighting circuits of FIG. 3.

It will be apparent that the FIGS. 3 and 4 summing, weighting, and other circuits, which correspond functionally to the FIG. 1 neuron section 15–17 circuits and are for use with a resistance divider network such as the network 12 of FIG. 1, are characterized by, in effect, dividing a current signal from a lesser significant bit position by two for summing at the next most significant bit position. In the FIG. 3 circuits, current signals and related currents are indicated by heavier lines, and these circuits include three substantially identical summing cells 150–152 which perform the summing and the weighting functions and are associated with an output section 154 corresponding to the FIG. 1 section 17.

Cells 150–152 are individually connected to input conductors 156, which correspond to the conductors 56 associated with magnitude bit positions 27–29 and which provide these cells with input first differential voltage component signals indicated, respectively, by "V4", "V2", and "V1" and corresponding to the unweighted bit position signals on conductors 56 of FIG. 1. A branching conductor 158, which corresponds to the conductor 58 associated with the sign or reference bit position 26, provides each cell with a reference voltage "VR" which is the input second differential voltage component for the cell. Another branching conductor 161 provides each cell with the common mode voltage "VCM". Each cell 150–152 and elements of section 154 are depicted as having individual current sources 162 and current drains 163 indicated by conventional symbols.

Each cell 150–152 has a positive differential input element 170 and a negative differential input element 171 each represented by the conventional operational amplifier symbol, connected to a current source 162, and having a pair of differential inputs. One input of element 170 receives the corresponding first voltage component V4, V2, or V1; the element 171 receives the voltage VR at its input of the opposite polarity to the input of element 170 receiving the first voltage component; and the other input of each of the elements receives the VCM voltage. Elements 170 and 171 generate, respectively, currents 175 and 176 corresponding to the voltage differential at their inputs. It is apparent that each current 175 and the difference between currents 175 and 176 may each be considered as first signal representing the value of the corresponding unweighted bit position signal. However, the differential current signal and other, subsequently identified differential signals are utilized in a well-known manner to minimize the effects of fabrication and temperature differences in an integrated circuit embodying the cells 150–151.

Each cell 150–152 also receives second signal currents 180 and 181. Each current 180 and 181 is received by an element 184 which, in effect, divides this current in half, one half 185 being directed to one of the drains 163. Each of the remaining halves is provided to a corresponding one of a pair of current summing elements 187 which also receives the corresponding one of the currents 175 or 176 and generates third signal currents 191 and 192 so that current 191 is the sum of the current 175 and one half of the current 180 and current 192 is the sum of the current 176 and one half of the current 181. It is evident that the third signal currents 191 and 192 represent the sum of the value represented by the first signal currents 175 and 176 and one half of the value of a signal represented by second signal currents 180 and 181.

At cells 150 and 151, the second signal currents 180 and 181 are generated, respectively, by the cells 151 and 152; that is, by the one of the cells corresponding to the next lesser significant bit position to that to which the cell 150 or 151 corresponds. Cell 152, having no such lesser bit position, does not receive such a second signal current. More specifically, the third signal currents 191 and 192 corresponding to the least significant bit position 29 and to the intermediate bit position 28 are provided by any suitable conductors 195 as the respective second signal currents 180 and 181 to the next more significant bit positions 28 and 27. As a result of the successive division by two at bit positions 27–29 by the elements 184, it is evident that, at the most significant magnitude bit position 27, the third signal represented by the currents 191 and 192 thereof corresponds to the sum of the products of the unweighted bit position signals, which are provided on the conductors 156 associated with the bit positions 27–29, and the binary positional values of the bit positions 27–29.

When the division by two performed by elements 184 is considered, it is evident that the bit position weighting of FIG. 3 is by cascaded addition of binary fractions. This is in contrast to FIG. 1 where the weighting is by binary integers, as suggested by the indicia in multipliers 100–102, followed by parallel addition at summers 105. However, both the FIG. 1 and the FIG. 3 weighting are binary positional weighting which, in circuits embodying the present invention and whether by integers or by fractions, utilize currents and voltages dependent on the particular circuits and their associated gains.

It will be apparent that binary weighting by more than the depicted three magnitude bit positions can be accommodated by the use of circuits like those of FIG. 3, but having more than one intermediate bit position cell substantially like cell 151, each additional intermediate cell being connected, similarly to cell 151, to the next lesser and to the next more significant bit position cells.

Output currents 191 and 192 from summing cell 150 are provided, after modification by a sigmoid generator 200 corresponding to function generator 110 of FIG. 1, as a differential current input signal to any suitable operational amplifier 201 corresponding to a FIG. 1 driver 115. Amplifier 200 drains these currents to an associated drain 163 and generates therefrom a voltage signal 202 which is identified as "OUTN", which is typically a differential signal and which corresponds to one of the neuron output signals 22 and to the third signal represented by cell 150 currents 191 and 192 after modification by generator 200. As indicated by arrow 205, signal 202 is also provided to generator 200 which is connected to a current source 162 and drain 163 and serves, in any suitable manner and as indicated by arrowheads 206, to add current to or subtract current from the cell 150 output currents and thereby impose a desired sigmoid function on signal 202 as these output currents change from equal values.

Details Of Circuits Effective in Embodiments of the Present Invention

Details of CMOS circuits corresponding to a summing cell 150–152 of FIG. 3, an input amplifier 40 of FIG. 1, and the output section 154 of FIG. 3 are disclosed, respectively, in FIGS. 4, 5A and 5B, and 6A and 6B to enable one skilled in the art of VLSI circuits to make such circuits. The disclosed circuits are not, in themselves, a part of the present invention, but are believed to be in accordance with the best conventional design practice and provide an effective embodiment of the present invention. The circuits are designed, using typical rules, for 2 micron, double-poly, double metal, P well fabrication. The circuits are for use with resistors, corresponding to resistors 80 of FIGS. 2A and 2B and each of about 200 kilohms to about 4 megohms resistance, in an artificial neural system corresponding to that of FIG. 1 and having 64 to 96 inputs, having 32 to 48 neurons, and having synapses providing eight bit, signed magnitude weights. The circuits are shown at the transistor level, and each transistor is accompanied by a legend of the form "LaaWbbXnn" wherein "aa" is the length in microns of a channel of the transistor, "bb" is the width in microns of a channel, and "nn" is the number of parallel channels. Since the circuits are conventional, their operation is believed apparent from FIGS. 4, 5A and 5B, and 6A and 6B to one familiar with CMOS circuits using differential transistor pairs, current mirrors, and the like; however, the circuit elements and arrangements will be briefly described in relation to the functions thereof.

The circuits of FIGS. 4, 5A and 5B, and 6A and 6B are for 5 volt operation. The reference or common mode voltage, VCM, is selectable; however, the circuits give minimum power dissipation and maximum linearity when this voltage is 1.5 volts and the sigmoid limits, which correspond to those set by generator 200, are 0.5 and 2.5 volts. Each circuit utilizes a conventional biasing arrangement using voltages provided by respective bias portions of the FIGS. 5A and 5B circuit and of the 6A and 6B circuit, these portions being to the left of a dash line 300 in FIG. 5A and FIG. 6A. The FIG. 6A portion provides three bias voltages, indicated by "BV1", "BV2" and "BV3" and by numeral 302, to each FIG. 4 summing cell circuit. In an actual embodiment of a neuron embodying the principles of the present invention, there are as many of these FIG. 4 circuits as there are magnitude bits in each weight, the FIG. 4 circuits being located in the body of the neuron as in the depictions of FIGS. 1 or 3. FIG. 4 circuit;

The FIG. 4 summing cell circuit receives five inputs: the reference voltage "VR", identified by numeral 305, from the sign bit position of an associated resistance divider network 12 and corresponding to the voltage on the FIG. 1 conductor 58; the common mode voltage "VCM", identified by numeral 306; an unweighted bit position voltage signal "VIN", identified by numeral 307 and corresponding to the voltage on a conductor 56 of FIG. 1; an input current signal "POSIIN", identified by numeral 308 and corresponding to the FIG. 3 signal current 180; and an input current signal "NEGIIN", identified by numeral 309 and corresponding to the FIG. 3 signal current 181. The FIG. 4 summing cell circuit generates two output signal currents, "POSIOUT", identified by numeral 311 and corresponding to the FIG. 3 signal current 191; and "NEGIOUT", identified by numeral 312 and corresponding to the FIG. 3 signal current 192. The FIG. 4 circuit has a number of conventionally represented current sources and drains, the current from each source being cascode biased thereat by a pair of transistors 315 individually receiving bias voltages "BV1" and "BV2".

Two differential, p-channel transistor pairs 320 and 321 each conduct a current so biased, one transistor of each pair receiving VCM as its gate voltage and the other transistors of the pairs receiving, respectively, VIN and VR so that pair 320 corresponds to an element 170 of FIG. 3 and pair 321 corresponds to an element 171 thereof. The current from the pair 321 transistor receiving VR and the current from the pair 320 transistor receiving VCM are combined as a current 324, which corresponds to the FIG. 3 current 176; and the current from the pair 320 transistor receiving VIN and the current from the pair 321 transistor receiving VCM are combined as a current 325 which corresponds to the FIG. 3 current 175. To provide the general functions of the FIG. 3 summing elements 187, current 325 is combined algebraically with the NEGIIN current indicated by arrows 327, and current 324 is similarly combined with the POSIIN current indicated by arrows 328.

After biasing by BV3, these combined currents, 325 plus 327 and 324 plus 338 are drained, respectively, by a current mirror input transistors 331 332 each having "2" parallel channels. The corresponding output current mirror transistors, indicated respectively by numerals 335 and 336, receive current biased successively by a pair of the transistors 315 and then by BV3 at a transistor 337. In contrast to input transistors 331 and 332, output transistors 335 and 336 have only "1" channel with the same width and length as the two channels of the input transistors. Also, the bias transistors 315 and 337 associated with the current mirror output transistors have "1" channel of dimensions "L5W25" while those associated with the current mirror input transistors have "2" such channels. Transistors 335 and 336 thus drain only one-half of the current drained by the input transistors so as to provide the divide-by-two function of the elements 184.

In the FIG. 4 summing cell circuit, the differences in currents between those provided by the bias transistors 315 associated with the current mirror output transistors 335 and 336 and those drained by the transistors 335 and 336 exit or enter the circuit as, respectively, the output signal currents POSIOUT or NEGIOUT. These difference currents are indicated by arrows 338 and flow on conductors 339 having one end connected between the associated bias transistor 337 and pair of bias transistors 315.

In the FIG. 4 circuits, the voltage input signals VR, VCM, and VIN are inverted by the p-channel transistor pairs; the currents drained by transistors 335 and 336, which equal one half of the currents drained by transistors 331 and 332, are not provided directly as the output signal currents POSIOUT and NEGIOUT; and the currents 338 which define a differential current output signal of the FIG. 4 circuit may enter or exit the circuit. However, it will be apparent to one skilled in the art of CMOS design using differential signals that a plurality of the FIG. 4 circuits connected as shown in FIG. 3 serve to receive the corresponding unweighted bit position, voltage signals VIN and receive the POSIOUT/NEGIOUT current signals generated each of the circuits corresponding to a next lesser significant bit position, each of the circuits generating its own POSIOUT/NEGIOUT signal representing the sum of the values of the VIN signals and one half of the value of the received such current signal. As a result and in such a plurality of the FIG. 4 circuits, the POSIOUT/NEGIOUT signal of the one of the circuits corresponding a most significant bit position corresponds to the sum of the products of each of the unweighted bit position signals VIN and its associated binary positional value.

Figure 5A:
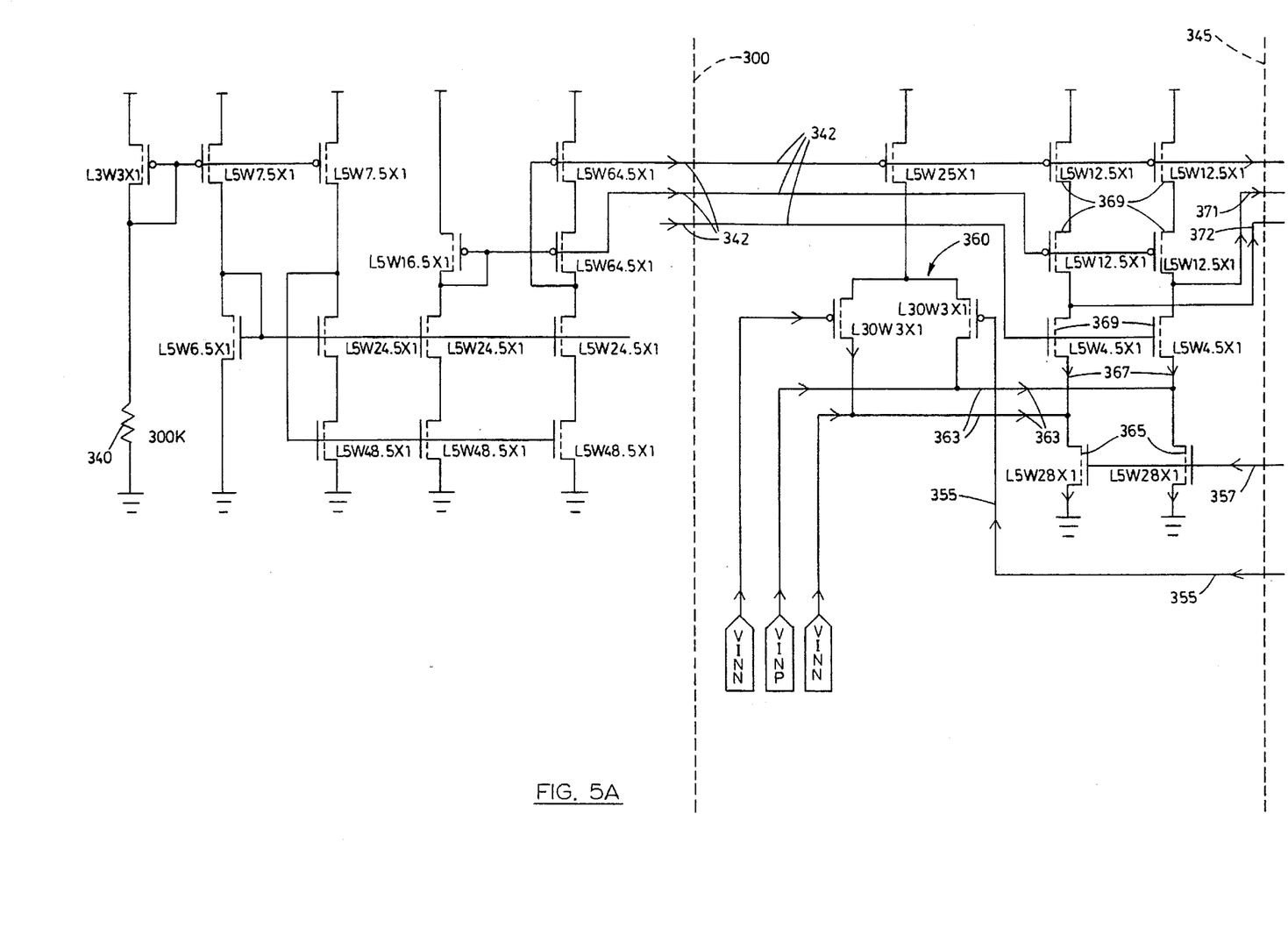
FIGS. 5A and 5B are a diagram at the transistor level of an input operational amplifier and associated bias circuit for use with weighting circuits like that of FIG. 4.
Figure 5B:
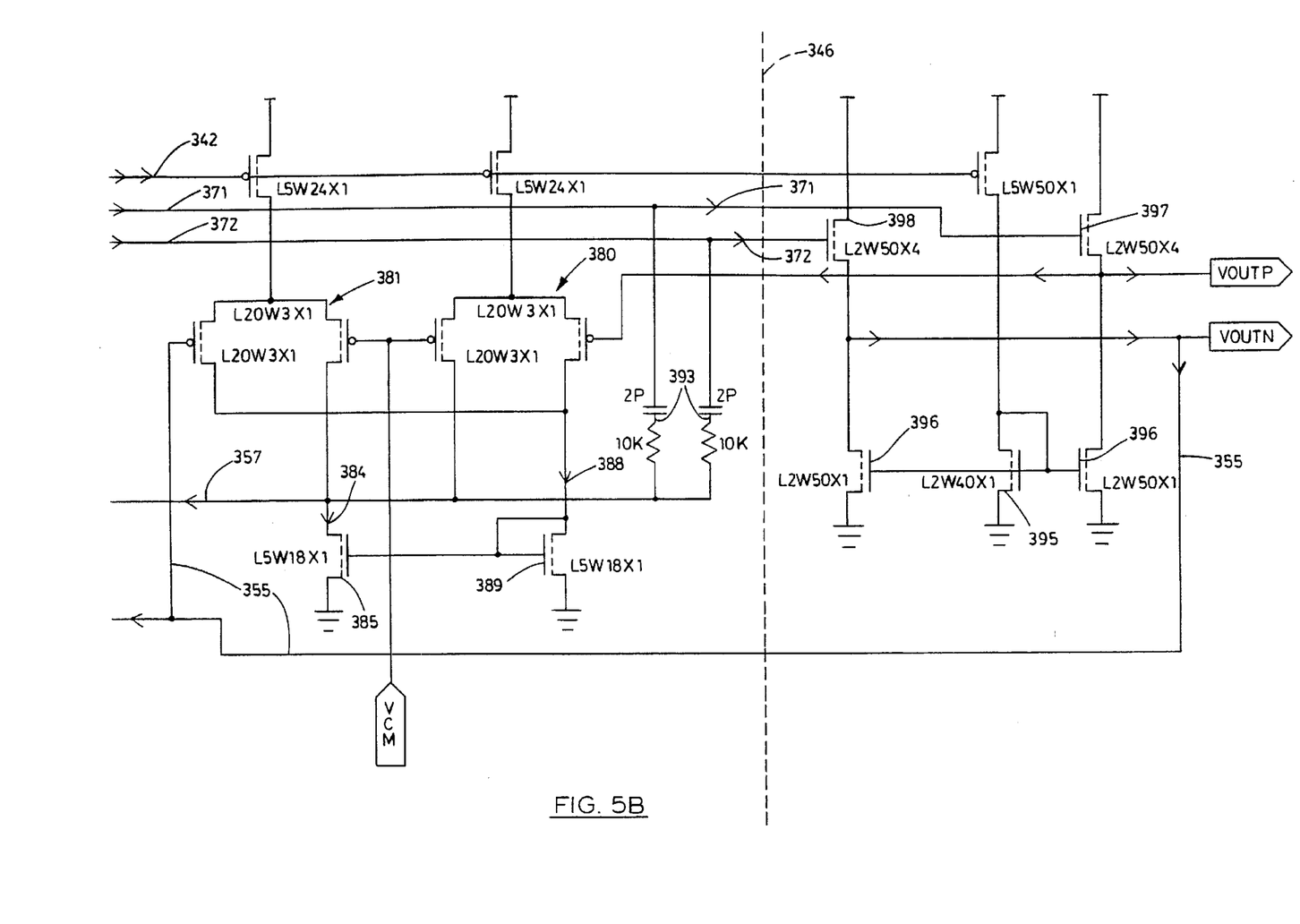

FIGS. 5A and 5B circuit:

The FIGS. 5A and 5B input operational amplifier circuit has the above-identified bias portion to the left of the line 300, this portion being conventional and generating, by successive current mirror stages whose initial input is selected by a resistor 340, three cascode bias voltages provided to the balance of the circuit by conductors 342. The FIGS. 5A and 5B operational amplifier also has an input portion depicted between lines 300 and 345, a control portion between lines 345 and 346, and an output buffer portion to the right of line 346.

The FIGS. 5A and 5B input portion receives a single, negative input voltage signal "VINN" corresponding to one of the FIG. 1 input signals 21. This input portion also receives, by a conductor 355, the necessary operational amplifier negative feedback voltage from the output portion of the amplifier, this feedback voltage being provided without the use of feedback resistors since the FIGS. 5A and 5B amplifier has unity gain. The input portion may also receive positive and negative current input signals identified respectively by "IINP" and "IINN". The FIGS. 5A and 5B operational amplifier control portion receives the common mode voltage VCM and provides a voltage to the input portion on a conductor 357 to maintain an equal and opposite offset from VCM of the operational amplifier output voltage signals "VOUTP" and "VOUTN" which are shown at the right of FIG. 5B and which correspond, respectively, to the voltage signals on the FIG. 1 conductors 45 and 46.

The FIGS. 5A and 5B input portion has a differential pair 360 of transistors. The gates of these transistors individually receive the negative feedback voltage 355 and VINN so as to determine currents 363—which may also be include the current input signals "IINP" and "IINN". Currents 363 are individually drained by a pair of transistors 365. The gates of transistors 365 receive the feedback voltage on conductor 357 and these transistors drain currents 367 determined by three successive cascode bias transistors 369 receiving the bias voltages on conductors 342. The FIGS. 5A and 5B input portion generates an output voltage signal having a positive component 371 and a negative component 372. Each of these components is provided to the buffer portion of the FIGS. 5A and 5B operational amplifier from between a pair of the bias transistors 369 so that these components are determined individually by the currents 363 and are raised or lowered together by the offset determining voltage 357.

The FIGS. 5A and 5B control portion has two differential transistor pairs 380 and 381, one transistor of each pair receiving VCM as its gate voltage and the other transistors of the pairs so receiving, respectively, VOUTP and VOUTN. The current from the transistors receiving VCM are combined as a current 384 drained through a transistor 385, and the current from the transistors receiving VOUTN and VOUTP are combined as a current 388 drained through a transistor 389. Transistors 385 and 389 are connected in current mirror relation with transistor 389 as the input transistor and with the voltage associated with current 384 provided to conductor 357 as the feedback voltage thereon. To suppress oscillations, this voltage is also connected through pairs 393 of series resistors and capacitors to the conductors providing the voltage components 371 and 372 to the FIGS. 5A and 5B buffer portion.

This buffer portion has a transistor 395 provided with a current biased by a voltage on one of the conductors 342. Transistor 395 is connected in current mirror relation with each of a pair of transistors 396, one transistor of this pair being connected to a current source through a transistor 397 whose gate receives the positive component voltage 371, and the other transistor being similarly connected through a transistor 398 whose gate receives the negative component voltage 372. The buffer outputs VOUTP and VOUTN are thereby generated at a conductor between, respectively, each transistor 397 and 398 and its associated transistor 396 for connection back to the differential transistor pairs 380 and 381 and for use as the differential voltage outputs of the FIGS. 5A and 5B operational amplifier. It will be apparent from the arrangement of the buffer portion that the voltage provided at each of the buffer outputs VOUTP and VOUTN may be maintained by the buffer portion either providing current to the output through the corresponding transistor 397 or 398 or draining current therefrom through the corresponding one of the transistors 396.

Figure 6A:
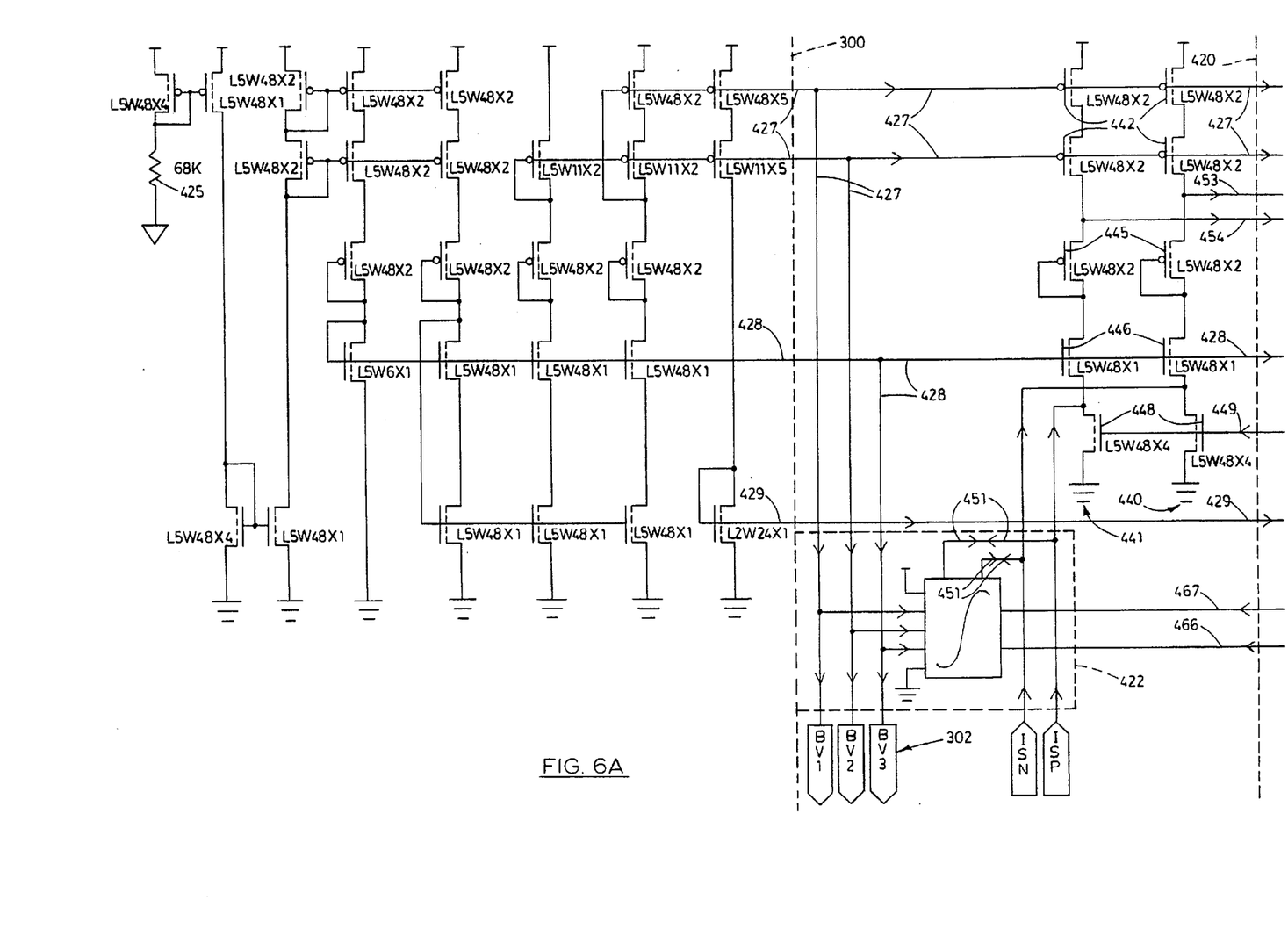
FIGS. 6A and 6B are a diagram at the transistor level of bias, output operational amplifier, and buffer circuits for use with weighting circuits like that of FIG. 4.
Figure 6B:
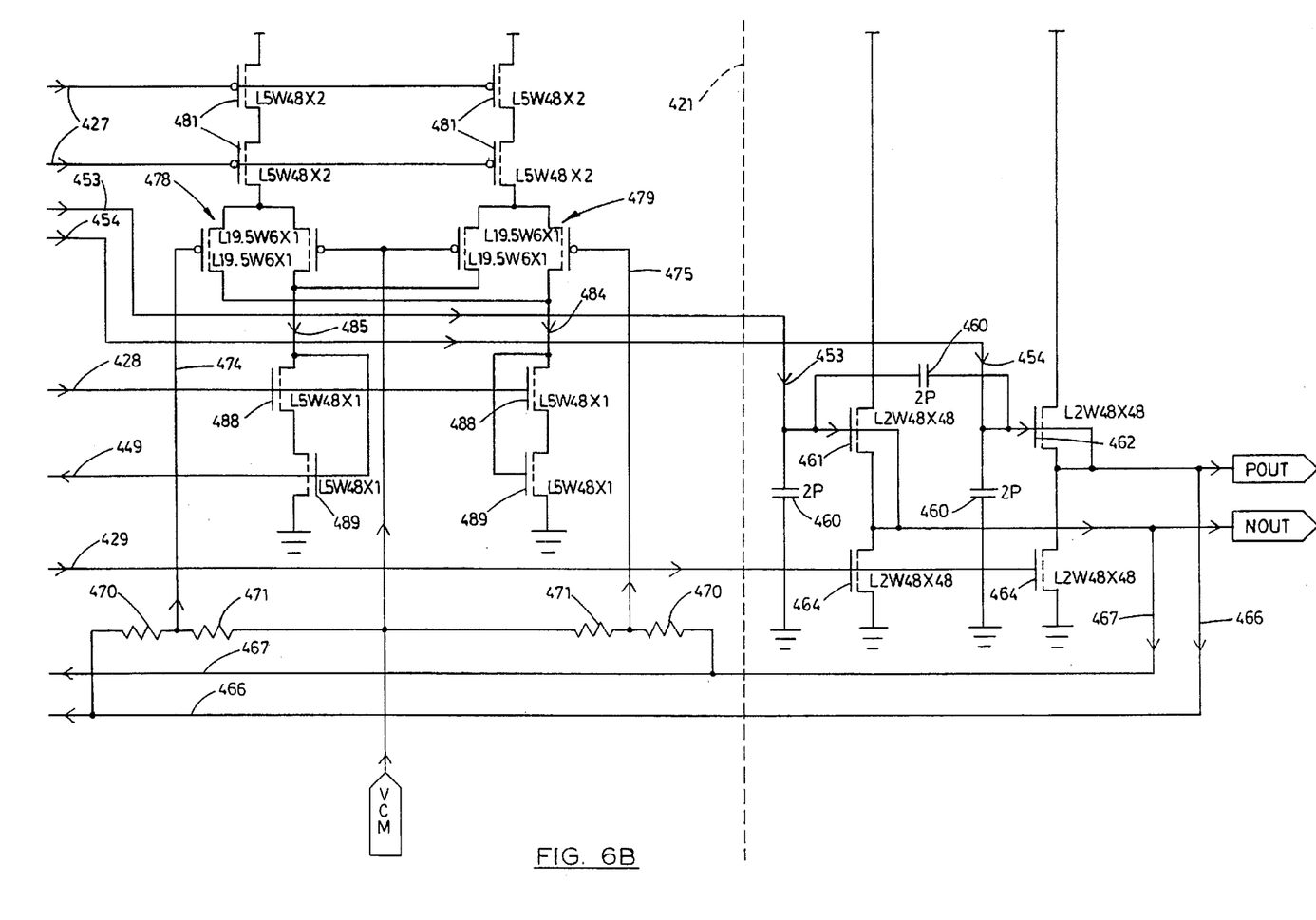

FIGS. 6A and 6B circuit

The FIGS. 6A and 6B output section has the above-identified bias portion depicted to the left of line 300, an amplifier input portion depicted between the line 300 and a dash line 420, an amplifier feedback portion between line 420 and a dash line 421, and a buffer portion depicted to the right of the line 421. The output section also includes, within a dash line box 422 a sigmoid generator corresponding to the generator 200 of FIG. 3 and, similarly, not depicted in detail. The FIGS. 6A and 6B bias portion is conventional and generates, by successive current mirror stages whose initial input is selected by a resistor 425, the above-identified three cascode bias voltages BV1, BV2, and BV3, which are provided, respectively, by a pair of conductors 427 and by a conductor 428, to the sigmoid generator and to the amplifier portions of FIGS. 6A and 6B as well as to the FIG. 4 circuit as indicated by numeral 302. The FIGS. 6A and 6B bias portion also generates a further bias voltage provided to the buffer section by a conductor 429.

The FIGS. 6A and 6B amplifier input portion has a two similar strings, 440 and 441, of series connected transistors. Each string receives current from a source through a pair of cascode biased transistors 442 individually receiving the bias voltages on conductors 427. This current is provided to a self biased transistor 445 and to a transistor 446 receiving the conductor 428 bias voltage and is drained by a transistor 448 provided with its gate voltage by a conductor 449 from the FIGS. 6A and 6B amplifier feedback portion. The strings 440 and 441 receive a differential current input signal corresponding to a weighted sum signal 106 of FIG. 1 and having a component "ISP" to string 441 and a component "ISN" to string 440, these components correspond, respectively, to the FIG. 2 cell 150 output currents 191 and 192 and, as indicated by arrows 451, being modified by the FIGS. 6A and 6B sigmoid generator in the same way the cell 150 currents are modified by the FIG. 3 sigmoid generator 200. Components ISP and ISN are received between the associated transistors 446 and 448, to generate a differential voltage signal having components 454 and 453 determined, respectively, by ISP and ISN and provided from between the corresponding transistors 445 and the lower of the transistors 442 to the FIGS. 6A and 6B buffer portion.

In this buffer portion, components 453 and 454 are connected to each other and to ground by capacitors 460 to suppress oscillations and are provided, respectively, to the gates of a pair of body connected transistors 461 and 462. Transistors 461 and 462 receive current directly from the source and each is connected to a drain transistor 464 having a gate receiving the bias voltage on conductor 429. The voltages between transistors 461 and 462 and their associated transistors 464 are provided, respectively, as components "POUT" and "NOUT" of a differential voltage output signal of the FIGS. 6A and 6B output section, this signal corresponding to one of the FIG. 1 signals OUT1 or OUT2 and to the FIG. 2 signal OUTN. Transistors 461, 462, and 464 each have forty-eight parallel channels, each 48 microns in width, to provide the output signal for wide distribution as an input to other neural network systems. In particular, the component NOUT is directly usable as input VINN to a FIGS. 5A and 5B circuit of such other system, and both POUT and NOUT may, as before mentioned and as described at greater length below, be provided directly to a network 12 dispensing with input amplifiers corresponding to FIG. 1 amplifiers 40 and the FIGS. 5A and 5B amplifier. POUT and NOUT are also provided, respectively, on conductors 466 and 467 to the sigmoid generator of box 422 for modification thereby of POUT and NOUT in accordance with a sigmoid function as described above in connection with generator 200 of FIG. 3.

Conductors 466 and 467 further provide the voltage components POUT and NOUT to the FIGS. 6A and 6B feedback portion for operational amplifier gain control as established conventionally by two series resistor pairs 470 and 471 each connecting one of the components to VCM, the resistor pairs providing a voltage 474 determined by POUT and a voltage 475 determined by NOUT, respectively, to two differential transistor pairs 478 and 479. The gate of one transistor of each pair receives the corresponding voltage 474 or 475 and the gates of the other transistors of the pairs receive VCM. Each transistor pair receives current cascode biased by transistors 481 receiving the voltages on conductors 427. The currents from the transistors receiving voltages 474 and 475 are combined as a current 484, and the current from the transistors receiving VCM are combined as a current 485. Currents 484 and 485 are each drained sequentially through a pair of series connected transistors 488 and 489, the gates of transistors 488 receiving the bias voltage on conductor 428. The gates of transistors 489 receive the voltages provided by the corresponding currents between the associated transistor 488 and the transistor pairs 478 and 479, and the one of these voltages associated with the current 485 is provided to the FIGS. 6A and 6B input portion on the above-identified conductor 449 to maintain the gain which is selected by resistor pairs 470 and 471 for the FIGS. 6A and 6B output section.

Embodiment with Systems Arranged as Neural Network Layers

Figure 7:
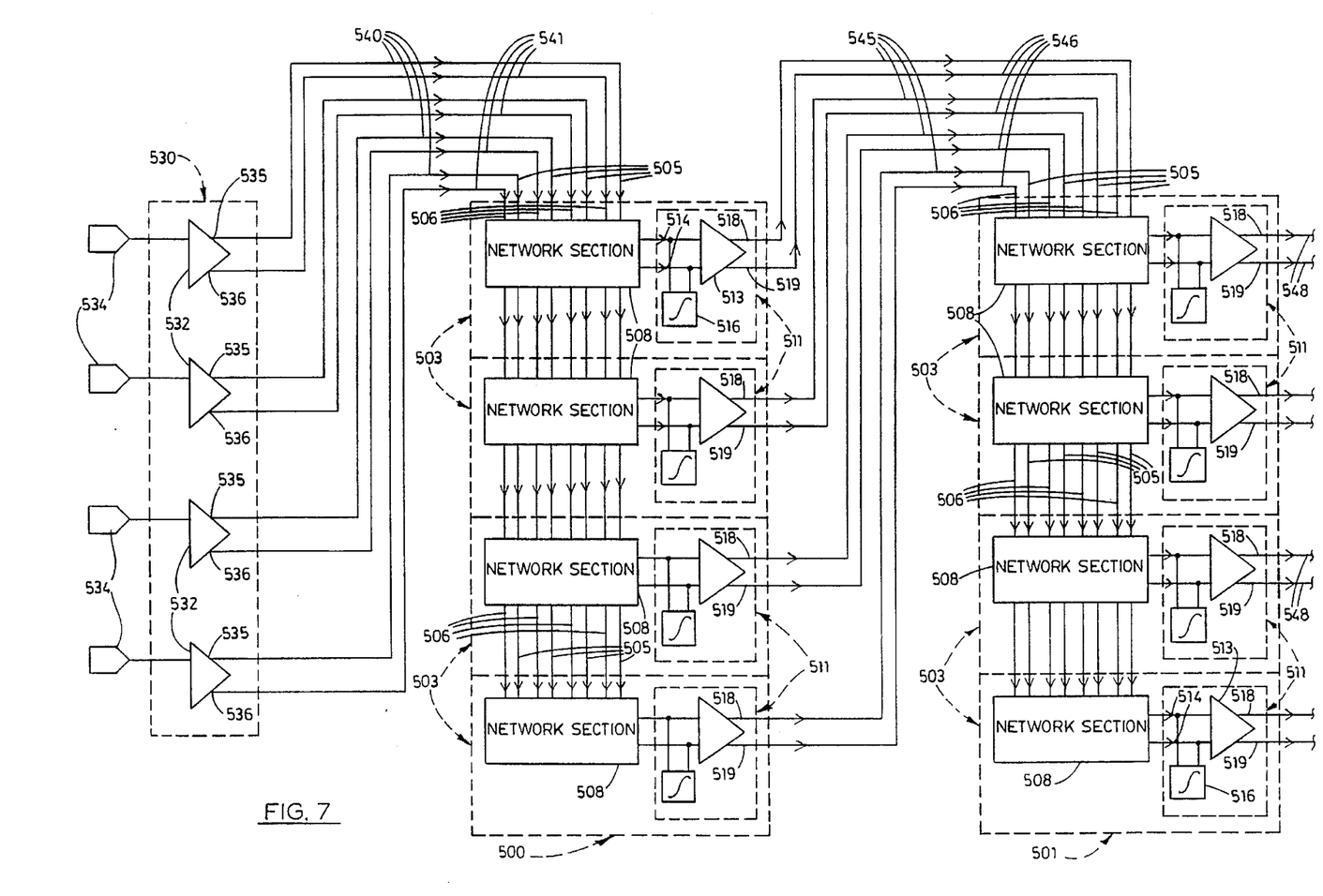
FIG. 7 is a diagram of a two artificial neural systems like that of FIG. 1 arranged as layers of an artificial neural network with output signals of one layer directly utilized as input signals for the second layer.

FIG. 7 shows a multilayer layer artificial neural network (ANN) arrangement corresponding to those described generally in the above-mentioned U.S. Pat. No. 4,951,239. The FIG. 7 arrangement has a first layer 500 and a second layer 501 each having four neurons 503 similar to a FIG. 1 neuron system 11 and thus adapted for use with the previously described elements depicted in FIGS. 2A–6B. The FIG. 7 arrowheads indicate schematic directions of signal flow rather than actual current flow.

Each layer 500 or 501 receives four layer input differential voltage signals each having a first and a second voltage component and associated currents provided, respectively and as subsequently described, on conductors 505 and 506 which correspond to the FIG. 1 conductors 45 and 46 and which extend through the neurons 503. Each neuron has a network section 508 which includes the elements corresponding to the FIG. 1 resistance divider network 12, summing section 15, and weighting section 16 and which thus also includes elements corresponding to the FIG. 3 summing cells 150–152. Each neuron also has an output section 511 which includes the elements corresponding to the respective FIGS. 1 and 3 output sections 17 and 154. Each section 511 has a layer output operational amplifier 513, which corresponds to a FIGS. 6A and 6B operational amplifier and which receives from the associated section 508 a signal 514 corresponding to a FIG. 1 signal 106. Amplifier 513 generates, with desired modification by a sigmoid generator 516, a layer output differential voltage signal having first and second voltage components, which correspond to the FIG. 6 components POUT and NOUT and associated currents and which are provided, respectively, on conductors 518 and 519. To represent values of the corresponding signal 514, the component voltages on these conductors are maintained substantially constant by associated currents having sources and drains in operational amplifier 513, as by transistors corresponding to the FIG. 6B transistors 461, 462, and 464.

The FIG. 7 arrangement includes an input section 530 corresponding to FIG. 1 input section 10 and having four initial input operational amplifiers 532 which correspond individually to and receive initial input signals 534 to the FIG. 7 arrangement. Signals 534 correspond to the FIG. 1 signals 21, and amplifiers 532 correspond to the FIG. 1 amplifiers 40 and may implemented by circuits like those of FIGS. 5A and 5B so as to generate from the signals 534 initial input differential voltage signals each having a first component and a second component provided, respectively, at terminals 535 and 536 of the amplifiers. These components are maintained at substantially constant voltages representing values of the corresponding signal 534 by associated currents having sources and drains in amplifiers 532, as by transistors corresponding to the FIG. 5B transistors 397, 398 and 396.

The FIG. 7 arrangement has a plurality of conductors 540 individually connecting terminals 535 of initial input amplifiers 532 with network conductors 505 of first layer 500 and has a plurality of conductors 541 individually connecting terminals 536 of these amplifiers with network conductors 506 of the layer 500. As a result the components and associated currents of the initial input differential voltage signals from amplifiers 532 are each directly connected to a corresponding network conductor of the first layer.

The FIG. 7 arrangement also has a plurality of conductors 545 individually connecting conductors 518 from the output amplifiers 513 of first layer 500 with conductors 505 of first layer 500 and a plurality of conductors 546 individually connecting conductors 519 from these amplifiers with conductors 506 of the layer 501. As a result the components and associated currents of the output differential voltage signals from amplifiers 513 are each directly connected to a corresponding network conductor means of the second layer.

In FIG. 7 and as indicated by wavy lines 548, conductors 518 and 519 from output amplifiers 513 of second layer 501 are depicted as not being further connected. However, it will be apparent that signals on these conductors may be connected to a further ANN layer associated with layers 500 and 501 or may be provided as an output from the FIG. 7 arrangement.

It is evident that, as a result of the connections provided by conductors 540, 541,545, and 546, the layer output amplifiers 513 of first layer 500 directly provide differential voltage input signals for a voltage divider network, such as a FIG. 1 network 12, of the second layer 501 without the use, in second layer 501, of input amplifiers corresponding to the FIG. 1 amplifiers 40 and to the FIGS. 5A and 5B amplifier, such a direct connection being particularly advantageous when several ANN layers are constructed on the same VLSI chip.

Obviously, many modifications and variations of the present invention are possible in light of the above teachings. It is, therefore, to be understood that the present invention may be practiced within the scope of the following claims other than as described herein.

What is claimed is:

1. An artificial neural network comprising:

input operational amplifier means for receiving a plurality of input signals and for generating therefrom a plurality of voltage signals, said voltage signals individually representing the input signals and being maintained substantially constant for each value of the corresponding input signal; and a neuron providing an output signal by weighting each of said voltage signals by binary weight bits in a predetermined number of bit positions, said neuron having a plurality of synapses corresponding individually to said voltage signals, each of said synapses having a plurality of synapse bit resistor means, which have substantially equal resistances and correspond individually to said bit positions, for connection to the corresponding voltage signals so as to provide synapse bit position signals corresponding individually to the values of said input signals when a weight bit at a corresponding bit position is "one", and for disconnection from the corresponding voltage signals when said weight bit is "zero", bit summing means for receiving said synapse bit position signals and for generating therefrom bit position sum signals representing the sums of the synapse bit position signals corresponding to each of said bit positions, and bit position weighting means for receiving said bit position sum signals and for generating said output signal therefrom so that said output signal corresponds to the sum of the products of each of said bit position sum signals and the positional values of the bit positions corresponding to the bit position sum signals, whereby said output signal corresponds to the sum of the products of the values of each of said input signals and weights represented by the weight bits of the synapses receiving the input signals.

2. The artificial neural network of claim 1 wherein:

each of the synapses includes reference resistor means connected to the corresponding voltage signal for providing a reference signal; and said bit position summing means includes differential operational amplifier means for receiving said reference signal and generating said bit position sum signals to correspond to the difference between said synapse bit position signals and said reference signal.

3. The artificial neural network of claim 2 wherein each of said synapses has a single reference resistor for all of said bit positions of the synapse.

4. The artificial neural network of claim 3 wherein said single reference resistor has substantially the same resistance as each of said synapse bit resistor means.

5. The artificial neural network of claim 3 wherein:

each of said weights is effective as having a positive sign or a negative sign;

said input operational amplifier generates each of said of voltage signals as a differential signal between a first component voltage and a second component voltage; and each of said synapses has sign switching means for selectively connecting said reference resistor to receive said first component voltage when a weight represented by the weight bits of the synapse has one of said signs and to receive said second component voltage when a weight represented by the weight bits of the synapse has the other of said signs, and magnitude switching means for selectively connecting each of said synapse bit resistor means to the one of said component voltages to which said reference resistor is connected when a weight bit at a corresponding bit position is "zero" and to the other of said component voltages when said weight bit is "one", said magnitude switching means disconnecting each of said synapse bit resistor means from said other of said component voltages when a weight bit at a corresponding bit position is "zero" and disconnecting each of said synapse bit resistor means from said one of said component voltages when said weight bit is "one".

6. An artificial neural system receiving a plurality of system input signals and providing a system output signal corresponding to the sums of the products of said input signals and predeterminable binary weights, each of said weights corresponding to one of said input signals and having a predetermined number of bit positions; said system comprising:

a plurality of network input operational amplifier means, which correspond individually to said system input signals, for receiving the corresponding system input signals and for generating therefrom network input differential voltage signals each having a first component and a second component, said components being maintained at substantially constant voltages representing values of the corresponding system input signal by currents having sources and drains in said amplifiers;

a plurality of network output operational amplifier means, which correspond individually to each of said bit positions, for receiving network output differential voltage signals each having a first component and a second component and for generating from said network output differential voltage signals unweighted bit position signals corresponding individually to said bit positions;

a voltage divider network having a plurality of first network conductor means, which correspond individually to the first components of said network input differential voltage signals, for receiving the corresponding first components and for conducting such currents, a plurality of second network conductor means, which correspond individually to the second components of said network input differential voltage signals, for receiving the corresponding second components and for conducting such currents, a plurality of third network conductor means, which correspond individually to the first components of the network output differential voltage signals and to the bit positions corresponding to said first components of the network output differential voltage signals, for transmitting said first components and for conducting such currents, fourth network conductor means for transmitting the second components of said network output differential voltage signals and for conducting such currents, and a plurality of resistor means, which have substantially equal resistances, for conduction of said currents so as to generate the network output differential voltage signals, each of said resistor means
- corresponding to a first network conductor means and to a second network conductor means for the same input differential voltage signal,
- corresponding to one of the third and fourth network conductor means, and
- having one terminal for selectable connection to a predetermined one of the first and second network conductor means and an opposite terminal connected to said one of the third and fourth network conductor means,
- so that said selectable connection defines a bit at the bit position to which said one of the third and fourth network conductor means corresponds; and bit position weighting means for receiving said unweighted bit position signals and for generating said output signal therefrom so that said output signal corresponds to the sum of the products of each of said unweighted bit position signals and the binary positional values of the corresponding bit positions.

7. The artificial neural system of claim 6:

wherein each of said resistor means includes a resistor element having said one terminal and said opposite terminal thereof disposed in spaced relationship;

wherein at each of said resistor elements the corresponding first network conductor means and the corresponding second network conductor means are disposed oppositely of said one terminal of said resistor element; and wherein each of said resistor elements includes a first link between said one terminal and said first network conductor means and a second link between said one terminal and said second network conductor means, so that said selectable connection to said predetermined one of said network conductor means is effected by severing the one of said links to the other of said network conductor means.

8. The artificial neural system of claim 6:

wherein for each of said weights there is
- one of said resistor means for use as a reference resistor means of the weight and corresponding to a predetermined reference bit position of the weight, and
- a plurality of said resistor means for use as magnitude resistor means and individually corresponding to said bit positions other than said reference bit position;

wherein each of said network output amplifier means receives a network output differential voltage signal and has a first terminal for one component of the network output differential voltage signal and a second terminal for the other component thereof;

wherein there is a plurality of said third network conductor means individually corresponding to said bit positions and to said network operational amplifier means, each of said third network conductor means interconnecting said opposite terminal of each of said magnitude resistor means corresponding to one of said bit positions and the first terminal of the one of said network output amplifier means corresponding to the same one of said bit positions; and wherein said fourth network conductor means interconnects said opposite terminal of all of said reference resistor means and the second terminal of all of said network output amplifier means.

9. The artificial neural system of claim 8:

wherein said first component of each of said network input differential voltage signal is a positive component thereof and is provided on the corresponding one of said first network conductor means and said second component of each of said network input differential voltage signal is a negative component thereof and is provided on the corresponding one of said second network conductor means; and wherein at each weight
- connection of said reference resistor means of the weight to the corresponding one of said first network conductor means defines the weight as negative,
- connection of said reference resistor means of the weight to the corresponding one of said second network conductor means defines the weight as positive,
- connection of any one of said magnitude resistor means to the same one of said first and second network conductor means as said reference resistor means is connected defines the bit corresponding to the magnitude resistor means as "zero" and
- connection of any one of said magnitude resistor means to the other one of said first and second network conductor means than said reference resistor means is connected defines the bit corresponding to the magnitude resistor means as "one".

10. The artificial neural system of claim 8 wherein said bit positions include a most significant bit position, at least one intermediate significant bit position, and a least significant bit position and wherein said bit position weighting means comprises:

a plurality of weighting means corresponding individually to each of said bit positions for
- receiving the corresponding unweighted bit position signal,
- generating a first signal representing the value of said corresponding unweighted bit position signal,
- receiving a second signal generated by the one of said weighting means corresponding to the next lesser significant bit position, and
- generating a third signal representing the sum of the values of said first signal and one half of value of said second signal;

means for providing each of said third signals corresponding to said least significant bit position and to each said intermediate significant bit position as said second signal for each of said weighting means corresponding to a next more significant bit position so that said third signal of the one of said weighting means corresponding to said most significant bit position corresponds to the sum of the products of each of said unweighted bit position signals and the binary positional values of the corresponding bit positions; and means for generating said system output signal to correspond to said third signal of the one of said weighting means corresponding to said most significant bit position.

11. In an artificial neural arrangement receiving a plurality of initial input signals and having a first layer and a second layer, the improvement comprising:

each of said layers:
- receiving a plurality of layer input differential voltage signals each having a first component and a second component, each of said components being maintained at a substantially constant voltage representing a value of the corresponding layer input signal, and said signals having associated currents;

including a plurality of substantially identical artificial neural systems, each of said systems providing a system output signal corresponding to the sums of the products of said layer input signals and predeterminable binary weights, each of said weights corresponding to one of said layer input signals and having a predetermined number of bit positions and each of said systems including:

a plurality of network output operational amplifier means, which correspond individually to each of said bit positions, for receiving network output differential voltage signals each having a first component and a second component and for generating from said network output signals differential unweighted bit position signals corresponding individually to said bit positions;

a voltage divider network which receives said first component and said second component and the associated current of said layer input differential voltage signals and includes:

a plurality of first network conductor means, which correspond individually to first components of network input differential voltage signals, for receiving the corresponding first components and for conducting corresponding currents;

a plurality of second network conductor means, which correspond individually to second components of said network input differential voltage signals, for receiving the corresponding second components and for conducting corresponding currents;

a plurality of third network conductor means, which correspond individually to the first components of the network output differential voltage signals and to the bit positions corresponding to said first components of the network output differential voltage signals, for transmitting said first components and for conducting corresponding currents;

fourth network conductor means for transmitting the second components of said network output differential voltage signals and for conducting corresponding currents; and a plurality of resistor means, which have substantially equal resistances, for conduction of said currents so as to generate the network output differential voltage signals, each of said resistor means corresponding to a first network conductor means and to a second network conductor means for the same input differential voltage signal, corresponding to one of the third and fourth network conductor means, and having one terminal for selectable connection to a predetermined one of the first and second network conductor means and an opposite terminal connected to said one of the third and fourth network conductor means, so that said selectable connection defines a bit at the bit position to which said one of the third and fourth network conductor means corresponds; and bit position weighting means for receiving said unweighted bit position signals and for generating said system output signal therefrom so that said system output signal corresponds to the sum of the products of each of said unweighted bit position signals and the binary positional values of the corresponding bit positions; and a plurality of layer output operational amplifier means for individually receiving said system output signals and generating therefrom a plurality of corresponding layer output differential voltage signals each having a first component and a second component, said components of the layer output differential voltage signals being maintained at substantially constant voltages representing values of the corresponding system output signal by associated currents having sources and drains in said layer output operational amplifiers;

a plurality of initial input operational amplifier means, which correspond individually to said initial input signals, for receiving the corresponding initial input signals and for generating therefrom initial input differential voltage signals each having a first component and a second component, the components of said initial input differential voltage signals being maintained at substantially constant voltages representing values of the corresponding initial input signal by associated currents having sources and drains in said initial input operational amplifiers;

means for connecting each first component and associated current of each of said initial input differential voltage signals directly to a first network conductor means of said first layer and for connecting each second component and associated current of each of said initial input differential voltage signals directly to a second network conductor means of said first layer; and means for connecting each first component and associated current of each of said layer output differential voltage signals of said first layer directly to a first network conductor means of said second layer and for connecting each second component and associated current of each of said layer output differential voltage signals of said first layer directly to a second network conductor means of said second layer, whereby the layer output operational amplifier means of the first layer directly provide differential voltage input signals for the voltage divider network of the second layer.

* * * * *